United States Patent
Hauer

[11] Patent Number: 6,137,262
[45] Date of Patent: Oct. 24, 2000

[54] PROCESS AND ARRANGEMENT FOR MONITORING AND/OR CONTROLLING CHARGING OF A MODULAR BATTERY, PARTICULARLY IN A BATTERY POWERED VEHICLE

[75] Inventor: Karl-Heinz Hauer, Braunschweig, Germany

[73] Assignee: Volkswagen AG, Wolfsburg, Germany

[21] Appl. No.: 09/246,516

[22] Filed: Feb. 9, 1999

Related U.S. Application Data

[63] Continuation of application No. PCT/EP97/03345, Jun. 26, 1997.

[30] Foreign Application Priority Data

Aug. 9, 1996 [DE] Germany .......................... 196 32 253

[51] Int. Cl.⁷ .................................................. H02J 7/00
[52] U.S. Cl. .......................................... 320/132; 320/130
[58] Field of Search .................................... 320/132, 130, 320/103, 106, 107

[56] References Cited

U.S. PATENT DOCUMENTS

| | | |
|---|---|---|
| 4,888,716 | 12/1989 | Ueno . |
| 5,270,636 | 12/1993 | Lafferty .................................... 320/101 |
| 5,455,499 | 10/1995 | Uskali et al. .................... 320/DIG. 21 |
| 5,469,042 | 11/1995 | Riihling .................................. 320/122 |
| 5,577,070 | 11/1996 | King et al. . |
| 5,592,067 | 1/1997 | Peter et al. ............................... 320/103 |
| 5,598,088 | 1/1997 | Richter . |
| 5,635,820 | 6/1997 | Park . |
| 5,754,052 | 5/1998 | Retzlaff .................................... 320/106 |
| 5,760,568 | 6/1998 | Naskali .................................... 320/139 |
| 5,945,804 | 8/1999 | Hansson et al. ........................ 320/119 |
| 5,994,878 | 11/1999 | Ostergaard et al. ..................... 320/132 |

FOREIGN PATENT DOCUMENTS

| | | |
|---|---|---|
| 0470065 | 7/1991 | European Pat. Off. . |
| 0693814 | 7/1995 | European Pat. Off. . |
| 2399150 | 2/1979 | France . |
| 2589008 | 4/1987 | France . |
| 3706076 | 9/1988 | Germany . |
| 4105369 | 2/1992 | Germany . |
| 4422005 | 12/1995 | Germany . |

*Primary Examiner*—Shawn Riley
*Assistant Examiner*—Lawrence Luk
*Attorney, Agent, or Firm*—Baker Botts L.L.P.

[57] ABSTRACT

In a process and arrangement for monitoring and/or controlling charging of a battery, particularly in a battery-powered vehicle, test data relevant to the monitoring are detected at the battery and sent to an evaluation unit through a power cable connecting the battery to at least one power consuming component. The evaluation unit is connected to the power cable and the test data are transmitted to the evaluation unit through the power cable using a coded alternating voltage. This eliminates the need for additional insulated signaling lines connecting the battery sensors to the evaluation unit and reduces the need for complicated wiring, particularly in batteries with modular construction as used in battery driven automobiles.

15 Claims, 2 Drawing Sheets

PROCESS AND ARRANGEMENT FOR MONITORING AND/OR CONTROLLING CHARGING OF A MODULAR BATTERY, PARTICULARLY IN A BATTERY POWERED VEHICLE

REFERENCE TO RELATED APPLICATION

This application is a continuation of International Application Ser. No. PCT/EP97/03345, filed Jun. 26, 1997.

BACKGROUND OF INVENTION

This invention relates to processes and arrangements for monitoring and/or controlling charging of a modular battery, particularly in battery powered vehicles.

Electric vehicles which derive their power from rechargeable batteries, particularly from lead storage batteries connected in series, are already used for a variety of purposes. Such environmentally friendly electric power systems are beginning to gain increasing acceptance in road vehicles.

A significant problem encountered in such applications is monitoring the operational readiness of the battery modules and displaying indications of their state of readiness.

Even in other applications of batteries, for instance starter batteries for vehicles, the condition of the battery charge and an appropriate indication of that condition is important to a user. A large number of different processes for determining the operational condition of a battery are known.

For example, German Offenlegungsschrift No. 37 06 076 discloses the determination of the density of the battery acid for ascertaining the charge condition of the battery. This process is relatively costly for continuous detection and indication by a remote indicator.

In addition, U.S. Pat. No. 5,598,088 discloses a process for determining the charge condition of a battery from a charge balance by evaluating the charging current and the discharge current. In order to obtain as precise an indication of the battery charge condition as possible, additional corrections are applied which take into account the magnitude of the current, the temperature, and the age of the battery. In a similar process disclosed in U.S. Pat. No. 4,888,716, in which the service life of a motor vehicle battery is also determined and indicated, the terminal voltage, the charging and discharge current, and the temperature of a battery are detected and processed in an evaluation circuit and the result is displayed in an indicator unit.

German Offenlegingsschrift No. 37 06 076 also discloses a process in which the terminal voltage of a battery is sampled at discrete time intervals and the result is compared with values of a characteristic curve to determine the charge condition of the battery.

U.S. Pat. No. 5,635,820 describes a process for controlling the charging of a battery for an electric vehicle in which the battery temperature, the battery voltage and the charging current are detected and evaluated in a charge control device.

In the prior art battery monitoring and charge control systems mentioned above, measurement transducers are required on the battery or the battery modules and cells for detecting the necessary measurement data and, in addition to the power cables for the battery, signal lines which are electrically isolated from the power cables of the battery extend from the measurement transducers to the control and evaluation circuits. Consequently, a high expenditure is required for signal lines, especially for modular batteries such as those used in electric vehicles.

German Patent No. 41 05 369 discloses a charge condition indicator arrangement for a battery in a remote control transmitter for information processing devices, particularly for consumer electronics devices such as radio or television units or video recorders. In this arrangement, measurement data for determining the charge condition of the battery are detected in the remote control transmitter and transmitted without wires via a transmission medium such as infrared light, ultrasound or electromagnetic waves to the device to be controlled. The device to be controlled contains an evaluation circuit and a display element to indicate the battery charge condition. Such wireless transmission of measurement data detected at the battery to an evaluation unit is only possible under favorable conditions, and in particular is not suitable for a motor vehicle.

SUMMARY OF THE INVENTION

Accordingly, it is an object of the invention to provide a process and arrangement for monitoring and/or controlling the charging of a battery which overcomes disadvantages of the prior art.

Another object of the invention is to provide a battery monitoring process and arrangement in which the operating condition of a battery can be monitored effectively at low cost.

These and other objects of the invention are attained by providing a process and arrangement for monitoring and/or controlling the charge condition of a battery in which charge condition data are transmitted by coded alternating current signals from the battery to an evaluation unit through power cables connected to the battery.

Thus, in accordance with the invention, measurement data detected directly at the battery, in particular the battery terminal voltage and the temperature, are transmitted over the power cables to the evaluation unit by coded alternating voltage signals.

As a result, the signal lines required in the prior art arrangements can be omitted entirely and electrical isolation is no longer necessary. In comparison with the cost of the additional signal lines required by the prior art, the circuit expenditure required for coded transmission of the measurement data to provide an indication of the operational condition of the overall arrangement is far lower, particularly when batteries are used that contain a large number of modules and/or cells each of which is separately monitored.

The measured values for each cell or module can be transmitted in coded form directly to the evaluation unit or they can be forwarded to other modules and/or cells and then retransmitted from there to the evaluation unit.

In this context, the data transmission is advantageously serial and frequency modulated. Simultaneous detection of measurement data from the individual modules is important for the evaluation of the operational condition of a battery consisting of individual modules in an overall battery arrangement. To this end, the detection of measurement data is advantageously triggered by the central evaluation unit so that the measurement are simultaneously made at all of the modules. The resulting measurement data are digitized and then buffered in storage circuits in the modules and from there are serially polled and evaluated by the evaluation unit in which each module is assigned an addressable module address.

To reduce energy consumption, measurement and data storage and transmission circuits are maintained in a state of readiness as a so-called "sleep mode" when the circuits are not triggered for simultaneous detection of measurement data and no measurement data are being transmitted to the evaluation unit.

In an arrangement for carrying out the process of data transmission on battery power cables in accordance with the invention, a conventional oscillating circuit is used to generate an alternating voltage in which a modulation voltage falls as a result of the excitation of the oscillating circuit at the battery and/or the modules and/or the cells. A microcomputer is used to evaluate the measurement data. In this arrangement the evaluation circuit can be integrated into a microcomputer that is also used for other functions.

Advantageously, storage circuits for buffering of measurement data are integrated into every module so that no expensive cabling is required between the measurement transducers and the buffers.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENT

Figure 1:
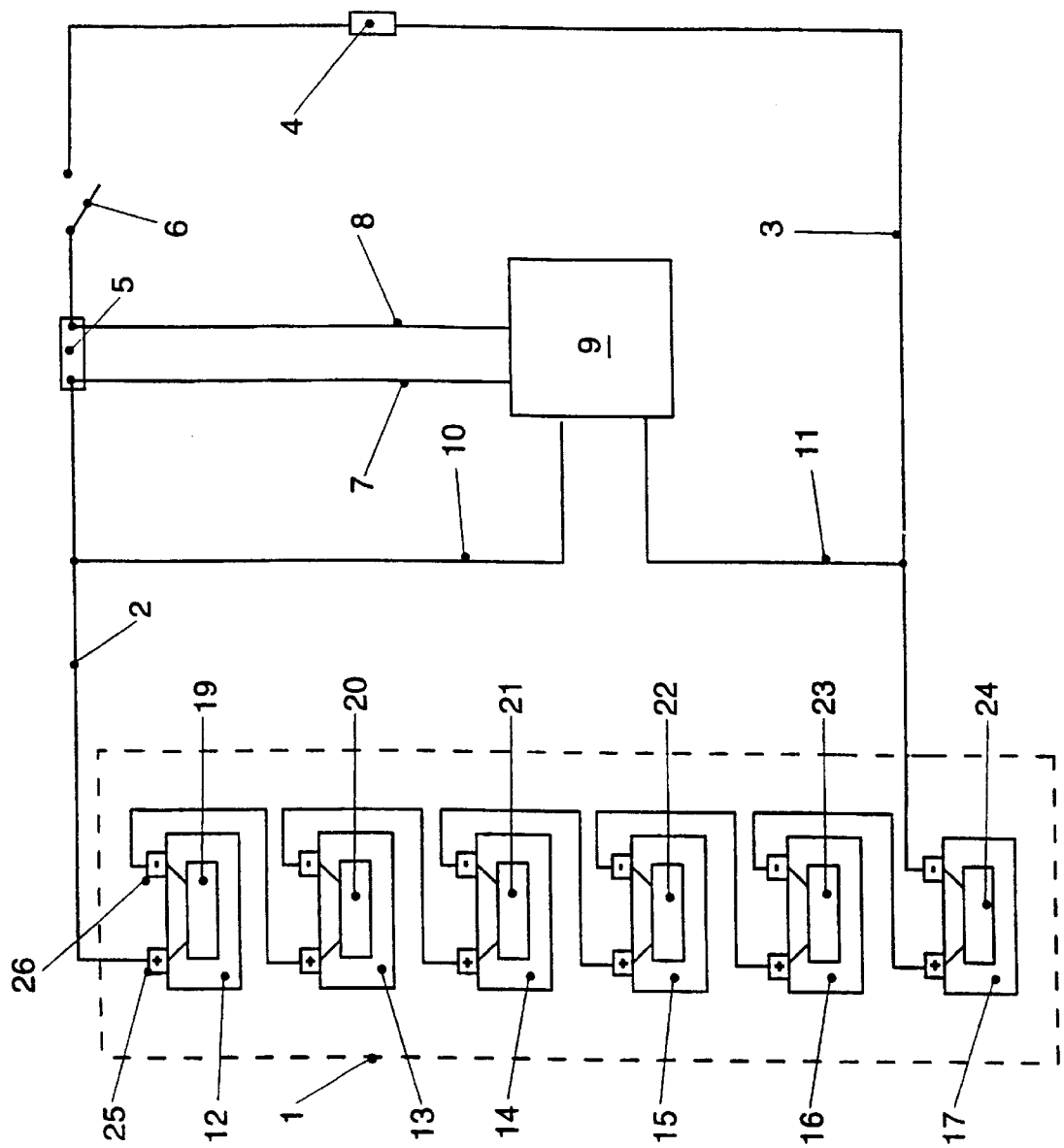
FIG. 1 is a schematic block diagram showing a representative embodiment of an arrangement for monitoring the charge condition of a battery in accordance with the invention.

In the typical embodiment of the invention schematically illustrated in FIG. 1, a battery 1 supplies electrical power through two power cables 2 and 3 to power consuming components that are shown schematically as a load resistance 4. Contained in power cable 2 are a measuring shunt 5 and a master switch 6. The measuring shunt 5 is connected through two measurement lines 7 and 8 to a central evaluation unit 9 which is also connected to the power cables 2 and 3 by two signal lines 10 and 11.

In the illustrated arrangement, the battery 1 constitutes the energy source for a battery powered vehicle and the load resistance 4 essentially represents an electric drive motor for the vehicle. Where ordinary lead storage batteries are used, the battery 1 is modular, consisting of a series of connected cells or modules 12–17. Integrated in the modules 12–17 are corresponding module circuits constituting module controllers 19–24.

Each of the module controllers 19–24 has two terminals 25 and 26 which are connected as shown in FIG. 1 to corresponding terminals 25 and 26 of each of the other modules 12–17 for detecting the terminal voltage. In addition, each of the module controllers 19–24 is connected to one or more additional measurement transducers (not shown) associated with each module, for example temperature transducers.

The central evaluation unit 9 contains, in particular, high-voltage filters, rectifiers, amplifiers and a microcomputer.

The module controllers 19–24 also include digitizing and buffering devices that work together with the central evaluation unit 9, as well as a connection to a seriesresonant circuit by which an alternating voltage containing the buffered measurement data can be transmitted.

Figure 2:
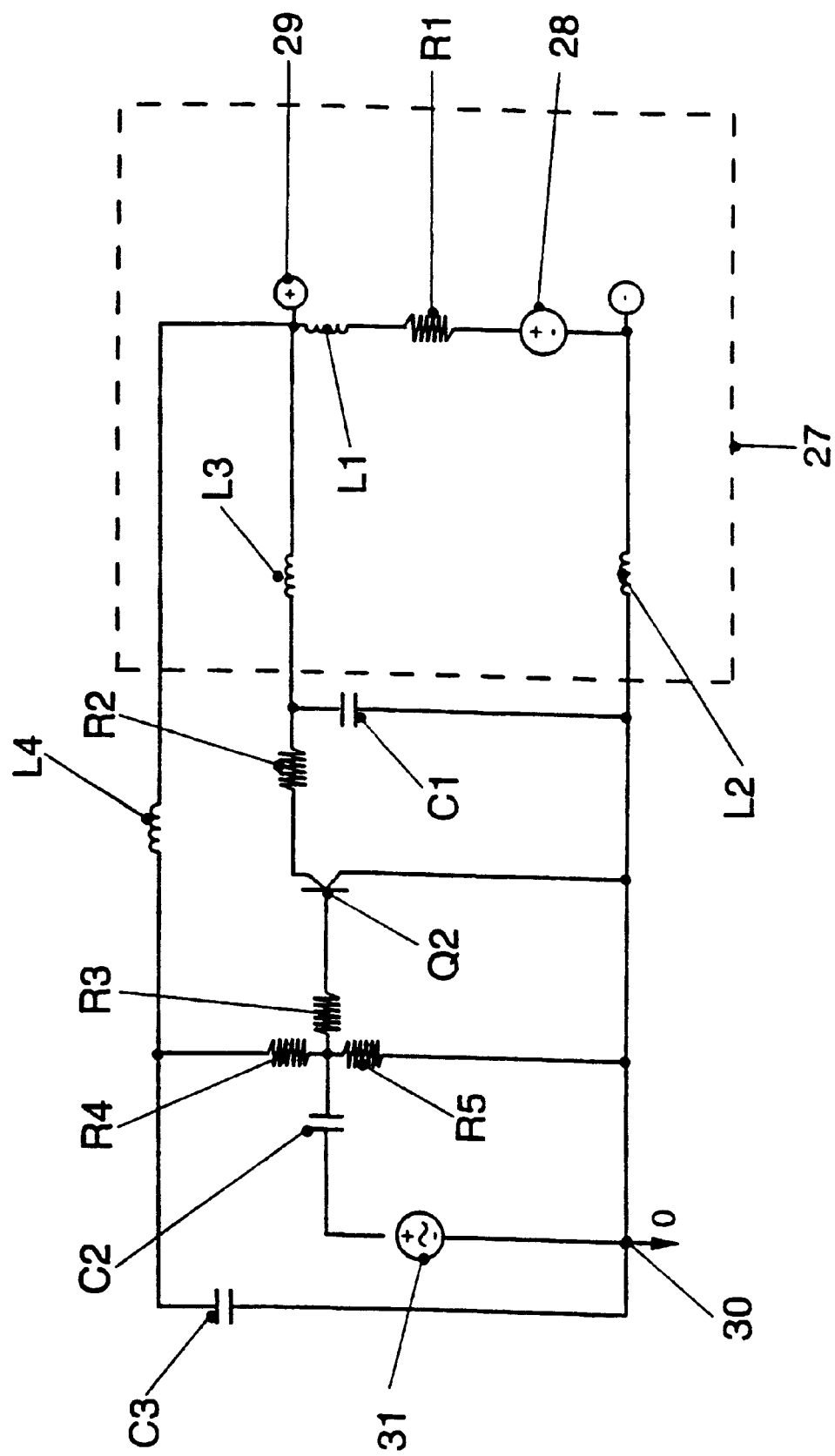
FIG. 2 is a schematic circuit diagram showing a representative series-resonant circuit for the transmission of measurement data with a coded alternating voltage for use in the invention.

The region 27 surrounded by a dashed line on the battery side in the schematic circuit diagram shown in FIG. 2, includes a module 28 of the battery, an ohmic resistance R1 and an inductance L2 representing the complex internal impedance of the battery. The inductances L2 and L3 represent the line inductances of the leads.

The remaining portion of the circuit is associated with the module controller. The leads with the inductances L2 and L3 are connected to a transistor Q2 that, in conjunction with four resistors R2, R3, R4, R5 and a capacitor C1, forms a series-resonant circuit that is driven at a frequency close to its resonant frequency.

An alternating voltage that is generated by an oscillator 31 is applied through an additional capacitor C2 to the junction of the resistors R3, R4 and R5. In addition, the positive pole 29 in the circuit section containing the battery is connected through an inductance L4 to the resistor R4 and also to ground 30 through a smoothing capacitor C3.

The circuit section of the central evaluation unit 9 for the transmission of coded information has a similar arrangement but differs in the tuning of the oscillating circuit L1, R1, L2, L3, and C1, since the entire battery 1 provides the voltage source 28.

The arrangement shown in FIGS. 1 and 2 operates in the following manner:

The module voltage and the module temperature are detected at each of the individual modules 12–17. If a module consists of several cells, each of the cells are likewise monitored with respect to its voltage condition.

The detecting circuits are activated by the central evaluation unit 9 for simultaneous measurement at all modules. The communication between the central evaluation unit 9 acting as a master and the module controllers 19 through 24 acting as slaves is always initialized from the master. The command "start measurement" thus applies for all module controllers. It initializes a voltage measurement and/or temperature measurement and the measurement data are digitized and buffered in a storage unit of the module controller.

Subsequently, the buffered measurement data are polled sequentially by the central evaluation unit 9. To this end, an address code is transmitted to each of the modules over the power cables. The addressed module controllers answer in the echo process, in which each buffered voltage value and temperature value is transmitted one at a time from a module controller to the central evaluation unit with the aid of one start bit (low potential), 8 data bits and one stop bit (high potential). Thereafter, the next module controller is polled. After all measured values have been received by the central evaluation unit, the evaluation is undertaken using conventional criteria, and the charge condition of the battery is indicated.

Although the invention has been described herein with reference to specific embodiments, many modifications and variations therein will readily occur to those skilled in the art. Accordingly, all such variations and modifications are included within the intended scope of the invention.

I claim:

1. A process for monitoring and/or controlling charging of a battery having power cables for supplying electric power to at least one power consuming component comprising:
   detecting at the battery measurement data relating to the condition of the battery; and
   transmitting measurement data from the battery to an evaluation unit by applying coded alternating voltage signals representing measurement data to a battery power cable.

2. A process in accordance with claim 1 wherein the measurement data are transmitted by frequency modulated alternating voltage signals.

3. A process in accordance with claim 1 wherein the measurement data include temperature data and voltage data.

4. A process in accordance with claim 1 wherein the battery comprises a plurality of individual modules and the measurement data are detected at the individual modules and are transmitted over a power cable directly to the evaluation unit.

5. A process in accordance with claim 1 wherein the battery comprises a plurality of individual modules and the measurement data are detected at individual modules and are transmitted through other modules to the evaluation unit.

6. A process in accordance with claim 1 wherein the battery comprises a plurality of individual modules and, for simultaneous acquisition of measurement data at the individual modules, the measurement is initiated by the evaluation unit and the measurement data are buffered in each module, and wherein each module has a module address by which the buffered measurement data are polled and evaluated by the evaluation unit.

7. A process in accordance with claim 6 wherein a circuit employed for triggering the measurements and for transmitting the measurement data switches itself to a state of readiness as a so-called "sleep mode" with low energy consumption when the circuit is not triggered for detection of measurement data and no measurement data are being transmitted.

8. An arrangement for monitoring and/or controlling charging of a modular battery comprising a plurality of measurement transducers each associated with a corresponding one of a plurality of modules of a modular battery; a central evaluation unit; a power cable connecting the battery to a power consuming component; and an output from each measurement transducer for applying measurement signals from the transducers through the battery cable to the central evaluation unit.

9. An arrangement in accordance with claim 8 wherein each module to be monitored has a module controller which is connected to a central evaluation unit through the power cable.

10. An arrangement in accordance with claim 9 including an oscillator circuit in each module for generating an alternating voltage which is applied to the power cable utilizing an internal impedance of each individual module and a capacitor of the corresponding module controller, which alternating voltage can be evaluated by the central evaluation unit.

11. An arrangement in accordance with claim 8 including an oscillator circuit for generating an alternating voltage which can be activated by the central evaluation unit, utilizing an internal resistance of a battery module and a capacitor in the evaluation unit, which alternating voltage can be evaluated by each of the individual module controllers.

12. An arrangement in accordance with claim 8 including a storage circuit associated with each module for buffering of digitized measurement data from the corresponding module detected after a triggering by the central evaluation unit, and wherein the central evaluation unit contains control means for serial polling of the buffered measurement data in the storage circuits of the modules.

13. An arrangement in accordance with claim 12 wherein each storage circuit is integrated in the corresponding module controller.

14. An arrangement in accordance with claim 9 wherein the module controllers are supplied with voltage directly from the modules.

15. An arrangement in accordance with claim 9 wherein each of the module controllers is integrated in the corresponding module.

* * * * *